United States Patent [19]

Crispin et al.

[11] 4,417,441
[45] Nov. 29, 1983

[54] RAM JET ENGINE

[75] Inventors: Brunhart Crispin; Nobert Voss, both of Taufkirchen; Wulf-Dieter Pohl, Zorneding; Dieter Thomaier, Munich, all of Fed. Rep. of Germany

[73] Assignee: Messerschmitt-Bökow-Blohm Gesellschaft mit beschränkter Haftung, Munich, Fed. Rep. of Germany

[21] Appl. No.: 27,715

[22] Filed: Mar. 29, 1979

[51] Int. Cl.³ .............................................. F02K 7/18
[52] U.S. Cl. ...................................... 60/251; 60/270.1
[58] Field of Search ................ 60/262, 266, 270 R, 60/270 S, 251, 270.1; 244/53 B

[56] References Cited

U.S. PATENT DOCUMENTS

| 3,115,008 | 12/1963 | Cohen et al. | 60/270 S |
| 3,807,169 | 4/1974 | Bradford | 60/270 R |
| 4,063,415 | 12/1977 | Rhoads | 60/270 S |

*Primary Examiner*—Stephen C. Bentley
*Attorney, Agent, or Firm*—Toren, McGeady and Stanger

[57] ABSTRACT

In a ram jet engine, a tubular combustion chamber is divided into a flame chamber followed by a mixing chamber. The ram air is supplied through intake diffusers located on the exterior of the combustion chamber. The intake diffusers supply combustion air directly into the flame chamber and secondary air is conveyed along the exterior of the combustion chambers and then supplied directly into the mixing chamber.

7 Claims, 5 Drawing Figures

U.S. Patent    Nov. 29, 1983    4,417,441
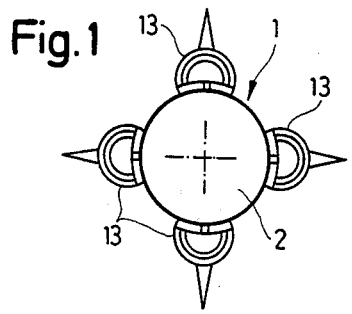
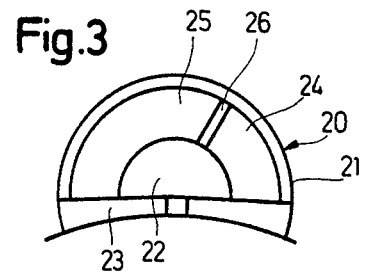
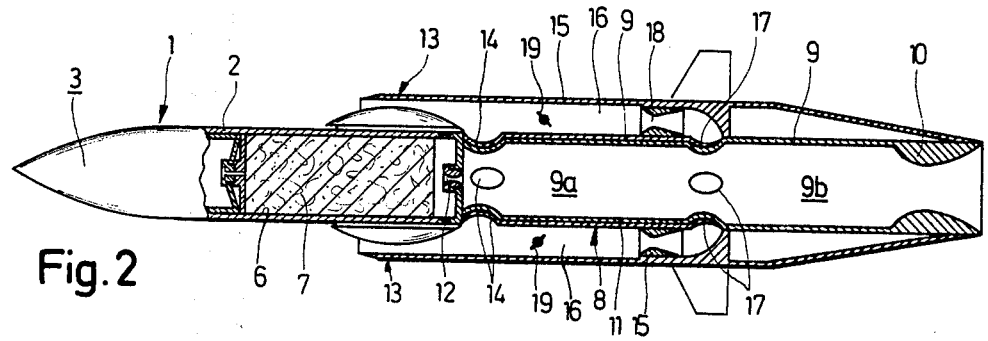
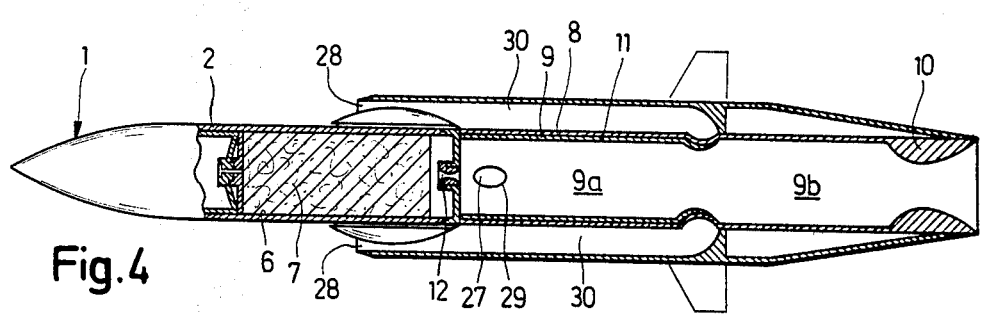
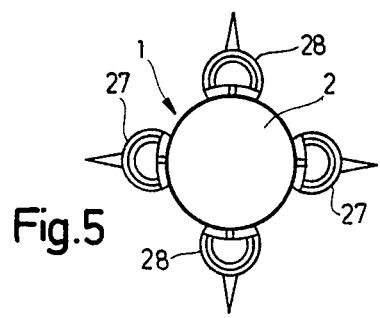

RAM JET ENGINE

The invention relates to a ram jet engine, particularly for the operation with fuels which contain, in particulate form, boron or like energy-rich materials having a high melting and evaporating temperature, provided with intake diffusers distributed over the periphery of the engine serving for the ram air supply to the combustion chamber.

The known ram jet engines of the above-mentioned type whose use as cruise engines for missiles is interesting inasfar as they offer the possibility of a fully integrated construction, are still unsatisfactory with regard to the level of the combustion efficiency and the width of the stability range. This is particularly true to an increasing degree when, instead of the conventional liquid fuels, energy-rich particle-containing fuels, such as suspensions of boron, aluminum, magnesium or the like in liquid hydrocarbons, or fuel-rich propelling charges with admixtures of the latter kind are used. This unsatisfactory circumstance is due to the fact that in all engine types in question all intake diffusers have heretofore been connected at the outlet side to the forward region of the combustion chamber. This is so because when the total ram air is supplied to the combustion chamber in this manner, the generation of a zone of sufficiently high temperature and a sufficiently long dwell period in the interior of the chamber for the principal combustion while simultaneously maintaining a low temperature at the combustion chamber outlet required for economical reasons has been found to be extremely problematic. Efforts have been undertaken to overcome this problem by means of installations arranged in the combustion chamber. However, it was found time and again in this connection that installations which are useful to some extent are always blocking the combustion chamber to a large degree; this is generally disadvantageous for the accommodation of a propelling charge for launching in the interior of the combustion chamber.

Accordingly, the present invention is based on the task to develop a reliable ram jet engine of the above-mentioned type which is simple in its design and which is distinguished, compared to the engine designs of the same type, by an improved combustion efficiency and a wider stability range without requiring bulky installations in the combustion chamber.

In accordance with the invention, this task is solved by dividing the total ram air from the intake diffusers into combustion air for the supply into the forward portion of the combustion chamber serving as a flame chamber and into channelled secondary air for the supply in the rearward portion of the combustion chamber serving as a mixing chamber, while maintaining an aerodynamically favorable contour.

The measure taken in accordance with the invention can be realized without a complicated structure. If this is done, the result is a ram jet engine in whose forward combustion chamber portion the entire chamber cross section is not offered to the total amount of ram air, but only to the amount of combustion air which is a small fraction thereof. The velocity deceleration and, therefore, the dwell time of the combustion air in the forward portion of the combustion chamber are of a corresponding magnitude. The reaction between the combustion air and the fuel takes place at a very high temperature level which results in the advantages of a high combustion efficiency and a wide stability range. This favorable effect is found to a significant extent in those fuels which contain boron or like energy-rich materials in particulate form with high melting and evaporating temperatures. This is so because, if the temperature in the forward combustion chamber portion were too low, a liquid oxide layer would adhere to the surface of the solid particles. For the combustion of the particulate material on the inner side of the said oxide layer, the latter would have to first be penetrated by the required oxygen which would take too long a time in the given spatial and flow conditions. The flow pattern according to the invention of the secondary air having the known purpose is the explanation for the fact that the high temperature level in the forward combustion chamber portion which is advantageous for the above-stated reasons can be ensured while simultaneously ensuring an economical final temperature without having to use bulky combustion chamber installations. The essential feature is the fact that the secondary air is supplied to the combustion chamber at an optimum location with respect to combustion technology. Finally, the fact that it is possible to not use combustion chamber installations for branching off the secondary air from the total ram air in the ram jet engine in accordance with the invention as described above, is also considered an advantage when it is the object to accommodate a sufficiently large rocket propelling charge in the combustion chamber for launching purposes.

In an advantageous further development of the invention, the intake diffusers are connected to a secondary air duct which leads underneath the fairing toward the mixing chamber, while maintaining lateral by-pass openings for the combustion air supply toward the flame chamber. If a flow-mechanical separation of the combustion air flow and the secondary air flow is desired, this can be achieved in a simple manner by arranging sonic nozzles in the secondary air ducts. However, this results in additional pressure losses. These pressure losses can be avoided if the supersonic regions of the individual inlet diffusers are utilized for the flow-mechanical separation, while not using the sonic nozzles in the secondary air ducts. In features representing further developments of the invention, this purpose is served by arranging in each intake diffuser a dividing plate which extends over the subsonic region into the supersonic region in order to divide the diffuser in a combustion air sector which merely communicates with the by-pass opening toward the flame chamber and a secondary air sector which merely communicates with the duct toward the rearward combustion chamber portion. When this latter-described manner of separation is used, there exists the additional possibility of optionally varying the portions of combustion air and secondary air by means of a simple slide member. However, the portions of combustion air and secondary air can also be varied in a simple manner when no dividing plates are provided. In this case, it is merely required to arrange a throttling device in all or individual secondary air ducts.

The above-described separation measures are not required if, in a further development of the invention, separate intake diffusers for combustion air and secondary air are arranged on the circumference of the engine. In this case, if flying maneuvers are performed which result in uniformly different incident flows of one and the same intake diffusers, it is advisable to always assign the ones with the poorer incident flows to the flame chamber and the others to the mixing chamber.

Embodiments of the invention are explained in more detail in the following with the aid of schematical drawings. In the drawing which is in the form of diagramatic sketches:

FIG. 1 shows the front view of a missile having a large range intended for use against sea targets, with a ram jet engine designed for supersonic operation;

FIG. 2 shows a longitudinal section of the missile according to FIG. 1;

FIG. 3 shows a front view of a supersonic intake diffuser which is semi-symmetrical with respect to rotation, the diffuser being modified compared to the one shown in FIGS. 1 and 2;

FIG. 4 shows, again in longitudinal section, another missile with an engine design which is modified compared to the one of FIG. 2, and FIG. 5 shows a front view of the missile according to FIG. 4.

The missile according to FIGS. 1 and 2 is denoted by reference numeral 1. Its front portion 2 contains the missile equipment and the payload. It further has a hollow space 6 which accommodates the gas generator 7. The latter has the function of supplying fuel gas for operating the ram jet engine 8 arranged in the tail. This fuel gas is able to spontaneously react, for example, with ram air, rendering superfluous any ignition devices. In the present example, the gas is the reaction product from the combustion of a propelling charge which is extremely poor in oxygen and has a content of solid particles in the order of magnitude of, for example, 75% by weight, with about 40% by weight boron, 10% by weight aluminum, 25% by weight ammonium perchlorate and 25% by weight binder.

Combustion chamber 9 and thrust nozzle 10 of the ram jet engine 8 in the tail are designed for long combustion periods. If the thermal loads appear to make it advisable, this design provides for the use of an ablative material 11 for thermal protection purposes. Concerning the combustion chamber 9 it is noted that, as can be seen in FIG. 2, it serves in the forward portion 9a as the flame chamber for the stoichiometric or nearly stoichiometric combustion of the fuel gas flowing in through a nozzle 12 in the forward chamber wall with a comparatively small partial amount of the total ram air from, for example, four supersonic intake diffusers 13 which are uniformly distributed over the missile circumference (FIG. 1) and in the rearward portion 9b as the mixing chamber for admixing the remaining amount of ram air to the hot combustion gas from the flame chamber 9a on its way toward the thrust nozzle 10. For the purpose of the above-described separation of the total ram air into combustion air and secondary air, each supersonic intake diffuser 13 is connected to a secondary air duct 16 leading to the mixing chamber 9b within its fairing 15, while maintaining a lateral by-pass opening 14 for the combustion air supply to the flame chamber 9a. The altogether four secondary air ducts 16 end at the openings of the combustion chamber jacket denoted by reference numeral 17 at the transition point from the flame chamber 9a and the mixing chamber 9b. In the region of the openings 17, they extend obliquely relative to the longitudinal axis of the engine, as seen in FIG. 2; in combination with the relatively large duct cross sections, this has a favorable effect for the mixing procedure inasfar as jets of secondary air are created which are able to flow all the way to the center of the chamber. If, in the present case, it is desired to flow-mechanically separate the combustion air flow and the secondary air flow, this can be achieved by arranging a sonic nozzle 18 in the individual secondary air ducts 16. It is possible to optionally influence the heat development in the flame chamber 9a, if the secondary air ducts 16 are at least in part provided with a flap 19 or a like throttling device for varying the amount of secondary air.

FIG. 3 shows a supersonic intake diffuser 20 which is semi-symmetrical with respect to rotation. Outer skin, central body and boundary layer plow of the diffuser are denoted by reference numerals 21, 22 and 23 in the recited order. From the diffusers illustrated in FIGS. 1 and 2, this diffuser differs in that no sonic nozzle is arranged in the secondary air duct. Instead, a dividing plate 26 extending over the sub-sonic region into the supersonic region is arranged in the diffuser interior in order to separate the latter into a combustion air sector 24 which merely communicates with the by-pass opening (FIG. 2, reference numeral 14) toward the flame chamber (FIG. 2, reference numeral 9a) and a secondary air sector 25 which merely communicates with the secondary air duct (FIG. 2, reference numeral 16) to the mixing chamber (FIG. 2, reference numeral 9b). This measure results in a separation of the combustion air flow and the secondary air flow wherein, contrary to the above-described separation by means of a sonic nozzle, no additional pressure losses occur. In addition, this measure offers the possibility of optionally varying the portions of combustion air and secondary air and, therefore, the heat development in the flame chamber by means of a simple slide member. A case in which this may be required exists, for example, when the perpendicular compression shock has the tendency to travel out of the intake plane of the diffuser in cases of large angles of incidence of the missile and correspondingly poor incident flow of the diffuser.

The engine design according to FIGS. 4 and 5, as is the case in the design according to FIGS. 1 and 2, has, for example, four supersonic intake diffusers 27, 28 which are distributed over the circumference of the missile 1 in the manner illustrated in FIG. 1, but with the difference that one pair of diametrically oppositely located diffusers 27 is exclusively connected to the flame chamber 9a through the openings denoted by reference numeral 29 and the other pair of diametrically oppositely located diffusers 28 is exclusively connected to the mixing chamber 9b through the ducts which are denoted by reference numeral 30.

The above-described diffuser assignment has been found useful with respect to those flying maneuvers in which the incident flows of the diffusers 27 are generally poorer than those of the diffusers 28. This is so because, in the case of incident flow conditions of the latter type, this results in an automatic throttling of the heat development in the flame chamber 9a, thereby reducing the existing possibility of an undesired deviation of the perpendicular compression shock from the diffusers 27. In the same manner, if predominantly those flying maneuvers are intended in which the diffusers 28 generally have a poorer incident flow than the diffusers 27, the diffusers 28 are analogously exclusively connected to the mixing chamber 9b and the diffusers 28 are exclusively connected to the flame chamber 9a with the omission of the ducts 30.

We claim:

1. Ram jet engine, for operation with fuels including boron and like energy-rich materials of high melting and evaporating temperature in particulate form, comprising an axially elongated tubular combustion chamber having a forward end and a rearward end, a flame chamber located within said combustion chamber and extending from the forward end toward the rearward end and terminating intermediate the forward and rearward ends, a mixing chamber located within said combustion chamber and extending from the end of said flame chamber spaced from the forward end of said combustion chamber toward the rearward end of said combustion chamber, intake diffusers distributed over the outside circumference of said combustion chamber for conducting a ram air supply to the combustion chamber, said intake diffusers arranged to divide the total ram air from the intake diffusers into combustion air for the supply thereof into said flame chamber and into channelled secondary air conveyed through at least certain of said intake diffusers exteriorly of said combustion chamber for the supply thereof inwardly through said combustion chamber wall directly into said mixing chamber spaced from the supply of combustion air into said flame chamber, while maintaining an aerodynamically favorable contour.

2. Ram jet engine according to claim 1, wherein each said intake diffuser includes a fairing mounted on the outside circumference of said combustion chamber each said intake diffuser including a secondary air duct located underneath its fairing outside said combustion chamber and opening into said mixing chamber and each said intake diffuser having a lateral by-pass opening for the combustion air supply into said flame chamber.

3. Ram jet engine according to claim 2, wherein a sonic nozzle is arranged in each said secondary air duct.

4. Ram jet engine according to claims 2 or 3, wherein said secondary air ducts are at least in part provided with a throttling device for varying the amount of secondary air.

5. Ram jet engine according to claim 2, said intake diffusers having a subsonic region and a supersonic region with a dividing plate extending over the subsonic region into the supersonic region in order to divide the diffuser space into a combustion air sector which communicates with said by-pass opening to said flame chamber and a secondary air sector which communicates with said duct to said mixing chamber.

6. Ram jet engine according to claim 1, wherein separate said intake diffusers being provided with first said intake diffusers supplying combustion air into said flow chamber and second said intake diffusers supplying secondary air in said mixing chamber.

7. Ram jet engine according to claim 6, wherein in the case of flying maneuvers with uniformly different incident flows of said first and second intake diffusers said first and second intake diffusers having the poorer incident flows being assigned to said flame chamber and the others being assigned to said mixing chamber.

* * * * *